(12) United States Patent
Back et al.

(10) Patent No.: US 6,262,662 B1
(45) Date of Patent: Jul. 17, 2001

(54) SYSTEMS AND METHODS THAT DETECT PROXIMITY INFORMATION USING ELECTRIC FIELD SENSING DEVICES AND A PAGE IDENTIFICATION USING EMBEDDED IDENTIFICATION TAGS

(75) Inventors: Maribeth J. Back, San Francisco; Richard J. Goldstein, Menlo Park; Steven R. Harrison, Portola Valley; Scott L. Minneman; Jonathan R. Cohen, both of San Francisco, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/512,890

(22) Filed: Feb. 25, 2000

(51) Int. Cl.$^7$ ..................................... G08B 13/14
(52) U.S. Cl. .................... 340/572.1; 340/825.19
(58) Field of Search ............... 340/572.1, 825.19, 340/10.1, 10.51, 551; 434/112, 113, 114, 115, 116; 235/435, 462.15

(56) References Cited

U.S. PATENT DOCUMENTS

| | | | |
|---|---|---|---|
| 4,857,913 | * 8/1989 | Lewiner et al. | 340/825.31 |
| 5,448,110 | * 9/1995 | Tuttle et al. | 340/825.54 |
| 5,497,140 | * 3/1996 | Tuttle | 340/825.54 |
| 5,528,222 | * 6/1996 | Moskowitz et al. | 340/572 |
| 5,717,381 | * 2/1998 | Jagielinski et al. | 340/572 |
| 5,936,527 | * 8/1999 | Isaacman et al. | 340/572.1 |
| 6,008,727 | * 12/1999 | Want et al. | 340/572.1 |
| 6,078,258 | * 6/2000 | Auerbach et al. | 340/572.1 |

OTHER PUBLICATIONS

"Bridging Physical and Virtual Worlds with Electronic Tags", Roy Want et al., Proceedings of CHI '99, pp. 1–9, Apr. 1999.
"BiStatix Whitepaper", BiStatix Technology, http://www-.motorola.com/LMPS/Indala/bistatix.htm, Feb. 12, 2000.
"Tag–it: Reader System Series 320 Reference Guide", Technology by Texas Instruments.
"Augmenting Real–World Objects: A Paper–Based Audio Notebook", Lisa J. Stifelman, Proceedings of CHI 96, http://media.mit.edu/people/lisa/chi96.html, Jan. 7, 2000.
"Applying Electric Field Sensing to Human–Computer Interfaces", Thomas G. Zimmerman et al., CHI '95 Proceedings, http://www.acm.org/sigchi/chi95/Electronic/documents/papers/tgz_bdy.htm, Feb. 24, 2000.
"QProx QTM1001A: Charge Transfer ('QT') Sensor Module", Quantum Research Group.
"Electric Field Sensing For Graphical Interfaces", Joshua Smith et al., Physics and Media Group, MIT Media Lab, pp. 1–17.

* cited by examiner

Primary Examiner—Daniel J. Wu
Assistant Examiner—John Tweel, Jr.
(74) Attorney, Agent, or Firm—Oliff & Berridge, PLC

(57) ABSTRACT

Identifier tags are embedded in pages of a document. Each of these identifier tags identifies the particular page that a reader is viewing. By correlating the currently read page to information stored memory, dynamic content corresponding to the currently read page can be activated. Additionally, proximity sensors are associated with one or more portions of the document. Thus, the range of dynamic content can also be activated by placing an object within the sensible area of the proximity sensors. This dynamic content can include, for example, lighting, sound effects, environmental conditions, or the like.

27 Claims, 3 Drawing Sheets

SYSTEMS AND METHODS THAT DETECT PROXIMITY INFORMATION USING ELECTRIC FIELD SENSING DEVICES AND A PAGE IDENTIFICATION USING EMBEDDED IDENTIFICATION TAGS

BACKGROUND OF THE INVENTION

1. Field of Invention

This invention is related to detecting a page identification. In particular, this invention is directed towards systems and methods for controlling dynamic content based on a page identification and proximity data.

2. Description of Related Art

A plethora of systems are available that detect or identify a particular page of a document. In particular, the systems generally involve mechanical switch-based techniques that are prone to false readings, or optical systems that have particular lighting or visual requirements. Alternatively, there are systems that require the reader to perform a specific function, for example, pressing a button, scanning, for example with a pen, a bar code, or passing a page through a reader to identify a page in, for example, a book.

SUMMARY OF THE INVENTION

Current page identification techniques require a user to perform an action that is not typical during interaction with a document. Furthermore, current systems are prone to false readings and can be easily affected by environmental conditions.

Accordingly, the systems and methods of this invention embed or otherwise associate identification tags to the paper of a page. A dedicated tag identification reader is affixed, for example, to the binding of, for example, a book. As a page is turned, the tag identification reader detects which pages are within sensible range. Knowing what pages, i.e., identification tags, are in the sensible range of the tag identification reader, the viewed page can be determined. Therefore, the user is able to interact with the document naturally, and is not required to perform any actions that are not typical when interacting with a document, such as a book.

Additionally, the systems and methods of this invention use sensor electrodes embedded in the document that sense electrostatic fields corresponding to the proximity of a user. Each sensor electrode measures conductivity. Placing, for example, a hand or a finger in the sensible area of the electrode generates a magnetic field that will short some current to ground. The sensor detects this current drop and can track the position of the hand or finger relative to the document. For example, the QProX™ QTM1001A Charge Transfer ('QT') Sensor Module by Quantum, incorporated herein by reference in its entirety, is a proximity sensor that could be used in conjunction with the methods and systems of this invention. Alternatively, electronic field sensors such as those discussed in "Electronic Field Sensing for Graphical Interfaces" by J. Smith et al, IEEE Computer Graphics and Applications, 1998, and "Applying Electric Field Sensing to Human-Computer Interfaces" by Zimmerman et al, CHI 1995, both incorporated herein by reference in their entirety, could be used equally well with the systems and methods of this invention.

Furthermore, the systems and methods of this invention, since they are capable of accurately detecting a page identification and proximity to one or more locations within a page of a document, can further control dynamic content based on the detected page identification and proximity data. For example, upon detecting one or more of the page identification and proximity data, dynamic content such as music, sound effects, voice recordings, spot lighting, ambient room lighting, effects on a computer, such as dynamic text, colors, patterns, graphics, or the like, temperature, chair motion control, volume control, pan, fade, web page access, or the like, can be activated to enhance the reading experience.

This invention provides systems and methods that detect a page identification.

This invention separately provides systems and methods that control dynamic content based on a detected page identification.

This invention provides systems and methods that detect a proximity of a portion of a user relative to a page.

This invention separately provides systems and methods that control dynamic content based on detected proximity information.

This invention additionally provides systems and methods that allow for page identification and proximity sensing without requiring actions from a user beyond that which is required for normal interaction with a document.

Specifically, the systems and methods of this invention are capable of using continuous control mechanisms. For example, it is possible to map dynamic content, for example, a sound, to the proximity of a hand to an identification tag. As a reader's hand approaches a certain area of the page, the sound, for example, gets louder. The volume can also be reduced as the reader's hand is removed from the sensible area of the proximity sensor. Since the dynamic content controller can be tuned to react at the same apparent rate of speed as the hand's motion, continuous interaction is less likely to induct the twitchy behaviors in computer games and binary button type embodiments.

Furthermore, the systems and methods of this invention can be used as an aid for the handicapped. For example, people can use one of the "dynamically enhanced" documents in accordance with this invention by moving their hands above the pages, no actual physical contact is necessary. Since the proximity sensors allow continuous control of a signal, rather than a button that can be found in the audio books for children that are out on the market today, these proximity sensors allow ranges of control.

Additionally, vocal soundtracks can be associated with a document so that the text is read along with, for example, sound and music for each page. In this exemplary embodiment, a book could be read aloud to a user, which could be of aid to the visually impaired.

However, it is to be appreciated that the proximity sensors can control any number of dynamic processes. For example, a handicapped individual may adapt the systems and methods of this invention to control, for example, lighting or sound processes in their home. In particular, a book could be adapted to home use. One page might be dedicated to living room processes to adjust the reading lights, the thermostat or the stereo content and volume. Another page may control kitchen appliances such as oven temperature, time settings on microwaves, or the like. Since all of these processes are better controlled using a range of controls, rather than simple on/off switches, the methods and systems of this invention are well adapted to this type of use.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following Figures, wherein.

DETAILED DESCRIPTION OF PREFERRED EMBODIMENTS

One or more page identification tags, such as a radio frequency identification tags, are embedded in, or otherwise associated with, one or more pages in a document, such as a book. Corresponding identification tag readers are placed in, for example, the book's cover. As the pages of the document are turned, the pages, and hence the identification tags, pass into and out of the sensible range of the identification tag readers. Thus, as one or more pages of, for example, a book, are turned, the identification tag reader(s) detect the current page being viewed by a reader.

Having detected the currently viewed page, the systems and methods of this invention can correlate the detected page identification tag and a page identification, which corresponds to one or more physical pages. This page identification can control instructions that affect dynamic content, such as environmental conditions.

Additionally, one or more proximity sensors, such as a conductivity sensing devices, are embedded in, or otherwise associated with, one or more pages in a document, such as a book. As a user interacts with the document, the user's hands pass into and out of the sensible range of the proximity sensor(s). Thus, as a user's hands pass into and out of the sensible area of one or more proximity sensor(s), dynamic content can be triggered based on a proximity sensor identifier and, alternatively, a users proximity to the particular sensor.

Figure 1:
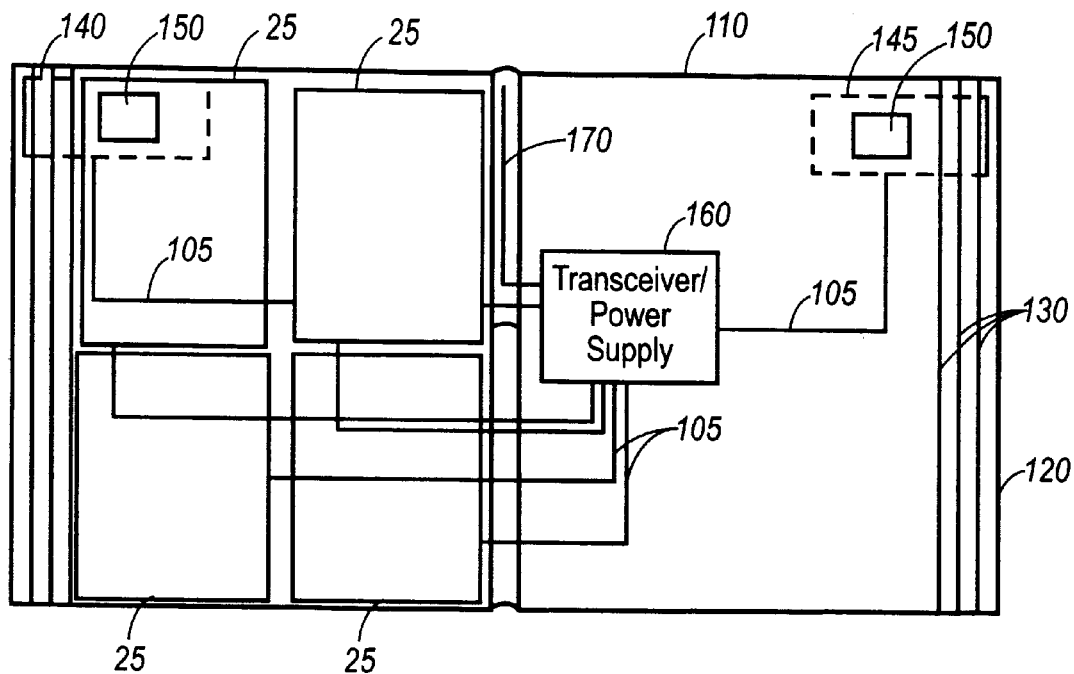
FIG. 1 illustrates an exemplary environmental block diagram of the page identification and proximity sensing system according to this invention.
Figure 1:
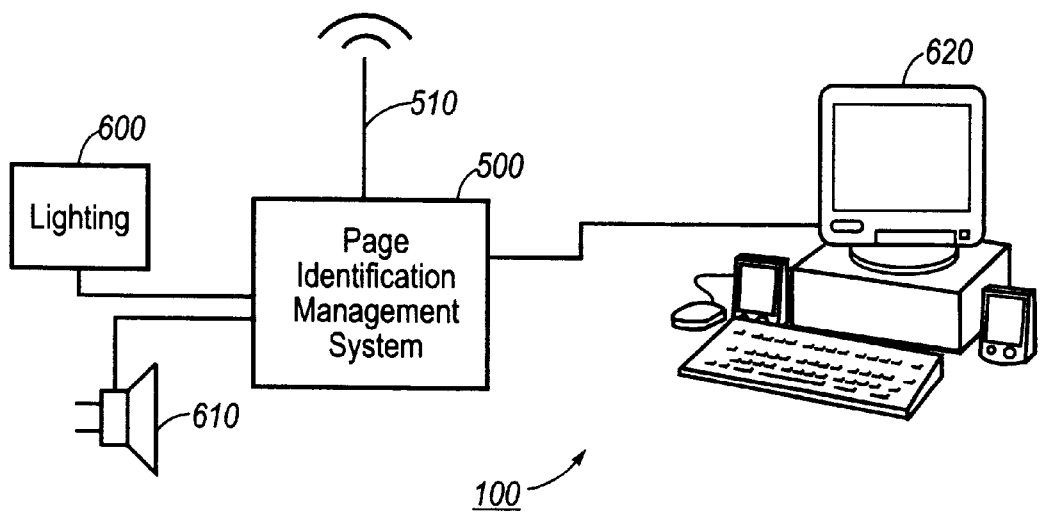

FIG. 1 illustrates an environmental block diagram of an exemplary page identification system according to this invention. The page identification system 100 comprises a document 110, such as a book, a cover 120, one or more pages 130, one or more identification tag readers 140, 145, one or more identification tags 150, one or more proximity sensors 25, a transceiver/power supply 160, links 105, 170 and 510, such as an antenna, a page identification management system 500, and one or more devices capable of providing dynamic content, such as a lighting device 600, a sound producing device 610 and a computer 620.

The document 110 comprises a cover 120 and one or more pages 130. The one or more pages have an associated identification tag 150. The identification tag(s) 150 contain information that correspond to one or more pages of a document. Associated with the cover 120 are one or more tag identification readers 140 and 145 that sense the presence of the one or more identification tags 150. Thus, as the pages 130 of the document 110 are turned, the identification tags 150 enter into and out of the sensible area of the identification tag readers 140 and 145.

Additionally, the one or more pages 130 are associated with one or more proximity sensors 25 of varying shape and/or size. The proximity sensor(s) 25 are activated when the presence of an object is determined to be within the sensible area of the proximity sensor 25.

The identification tag reader(s) 140 and 145, and the proximity sensors 25, are connected, via link 105, to a transceiver/power supply 160, which is in turn connected, via links 170 and 510, such as antennas, to the page identification management system 500. The page identification management system 500 receives the page identifications associated with the detected identification tags 150, and, if an object is within the sensible area of the proximity sensor 25, a signal representing a proximity sensor identifier and information corresponding to the distance of the object from the proximity sensor 25.

Having received the page identifications associated with the detected identification tags, and any proximity sensor information, the page identification management system 500 determines whether the page identifications and the activated proximity sensor(s) have any related dynamic content. If there is dynamic content associated with the page identifications or the activated proximity sensor(s), the page identification management system 500 forwards control information to the appropriate dynamic content device, such as the lighting device 600, the sound producing device 610, the personal computer 620, or the like.

While the exemplary embodiment illustrated in FIG. 1 shows the identification tag readers and the identification tags on top of one another, it should be appreciated that many different geometrical configurations are possible, such as offset, staggered, or the like, depending on, for example, the type of identification tag, the type of identification tag reader, the document thickness, the paper thickness and the sensitivity of one or more of the identification tag and the identification tag reader. In general, the relationship between the identification tag(s) and the identification tag reader(s) can be any configuration which allows communication between the devices.

Furthermore, the proximity sensors are arbitrarily illustrated as rectangles on one page. It is to be appreciated that the proximity sensors can be located in any position within one or more pages, or alternatively in the cover, and can be of any size and/or shape. Additionally, one or more proximity sensors may act in unison to cover a specific geometric pattern on a page. In general, the proximity sensors can be placed at any location within a document where the proximity to that location triggers dynamic content.

Figure 2:
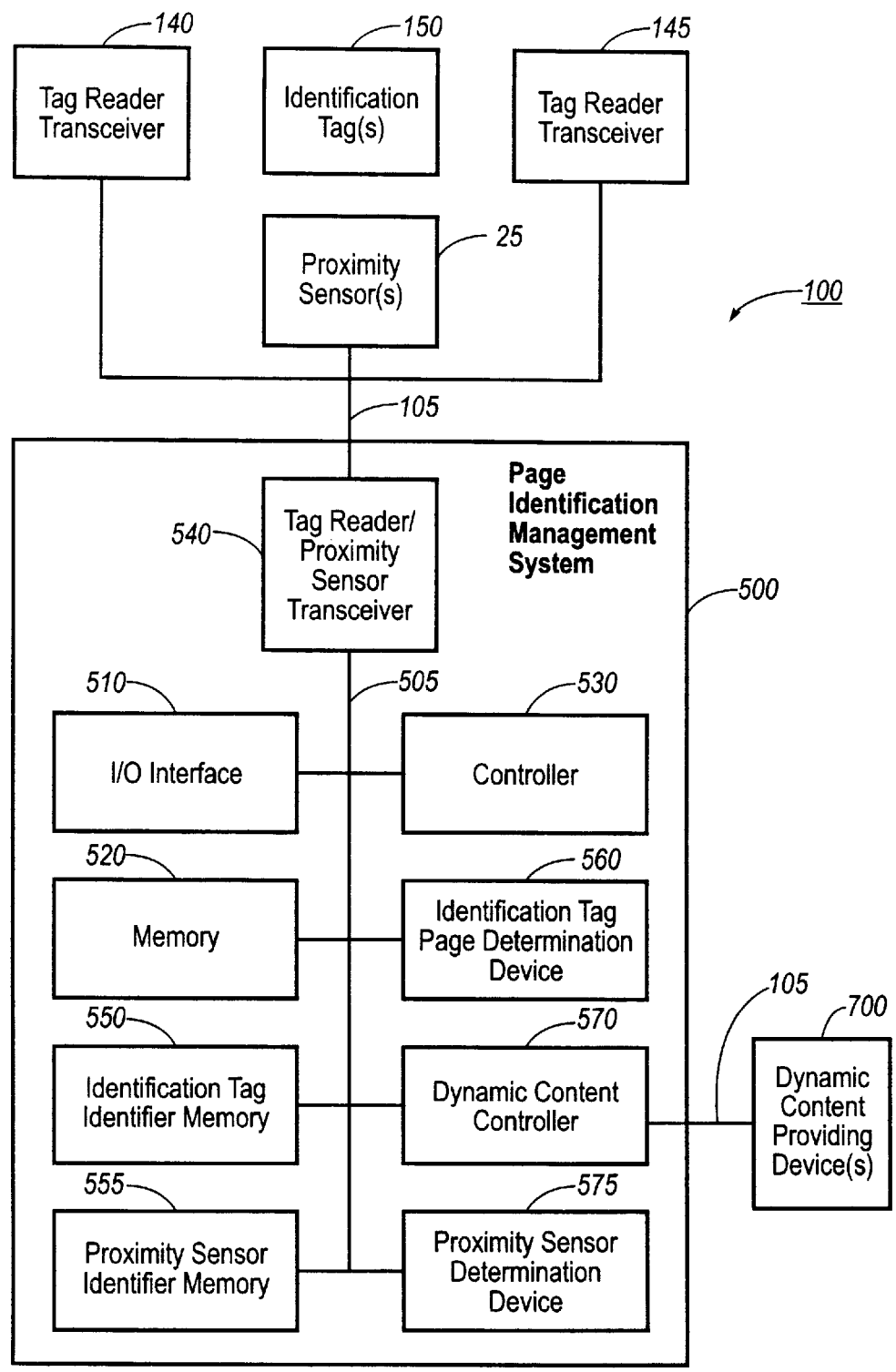
FIG. 2 is a functional block diagram showing an exemplary embodiment of the page identification and proximity sensing system according to this invention.

FIG. 2 illustrates a functional block diagram of an exemplary page identification system 100 according to this invention. The page identification system 100 comprises a page identification management system 500, comprising an I/O interface 510, a memory 520, a controller 530, a tag reader/proximity sensor transceiver 540, an identification tag identifier memory 550, an identification tag page determination device 560, a dynamic content controller 570, a proximity sensor identifier memory 555 and a proximity sensor determination device 575. The page identification management system 500 is connected, via link 105, to one or more tag reader transceivers 140, 145 that sense the presence, or absence, of one or more identification tags 150. Additionally, the page identification management system 500 is connected, via link 105, to one or more proximity sensors within a document. The page identification management system 500 is also connected, via link 105, to one or more dynamic content providing devices 700.

The identification tags 150 can be a radio frequency identification (RFID) product, such as the Tag-it™ system developed by Texas Instruments,® outlined in the Tag-it™ Reader System Series 320 Reference Guide, incorporated herein by reference in its entirety, or the BiStatix™ system by Motorola,® outlined in the BiStatix™ Whitepaper, herein incorporated by reference in its entirety.

Alternatively, the identification tags can be a physical device such as a micro-chip or other device capable of carrying information based on its mechanical, electrical or magnetic properties. For example, the identification tag can be an ultrasonic transmitter and the tag reader transceiver an ultrasonic receiver. Upon placing the identification tag in the sensible area of the tag reader transceiver, the tag reader transceiver reads the identification associated with the identification tag.

Alternatively, the identification tag could maintain, transmit or respond to an electric or magnetic field. The tag reader transceiver would then produce an electromagnetic field into which the identification tag can be placed. When the identification tag is placed in a sensible area of the tag reader transceiver, the identification tag becomes capacitively, inductively, or otherwise electro- or electromechanically coupled to the tag reader transceiver, and the information can be extracted from the identification tag and forwarded to the page identification management system.

In summary, the identification tag and identification tag reader(s) can be any device, or combination thereof, which are capable of respectively storing at least one page identification which can then be read by the tag reader transceiver.

The identification sensor(s) 25 transmit or respond to an electric or magnetic field. In particular, the proximity sensor (s) maintain an electromagnetic field into which an object can be placed. When the object is placed in a sensible area of the proximity sensor, the proximity sensor becomes capacitively, inductively, or otherwise electro- or electromechanically activated and information can be extracted from the proximity sensor and forwarded to the page identification management system 500.

In summary, the proximity sensor(s) can be any device, or combination of devices, which are capable of detecting the proximity of an object to the proximity sensor and forwarding information indicating the identity of the proximity sensor and any proximity data to the page identification management system.

The links 105 and 505 can be any wired or wireless link or any other known or later developed element(s) that is capable of supplying electronic data to and from the connected elements.

In operation, one or more tag reader transceivers 140, 145 which are embedded in, for example, the cover(s) of the book, detect the presence of one or more identification tags 150. Specifically, a tag reader transceiver can be embedded in both the front cover and the back cover of a book, illustrated as tag reader 145 and 140, respectively. Then, as a reader flips between the pages, the identification tags move, for example, from being in the sensible range of the back cover tag reader transceiver 140 to the sensible area of the front cover tag reader transceiver 145. As each tag reader transceiver 140 and/or 145 detect that an identification tag 150 has either come into or left the sensible area of the tag reader transceiver, a signal corresponding to that identification tag is forwarded to the page identification management system 500. In particular, one or more of the tag reader transceivers 140 and 145 forward, via link 105, a signal corresponding to the detected identification tag(s) 150.

Alternatively, a document, such as a book, may be provided with only one tag reader transceiver associated with the document. In this instance, as the tag reader transceiver detects an identification tag either entering or leaving its sensible range, the tag reader transceiver can forward a signal corresponding to the sensed identification tag(s) to the page identification management system 500. Furthermore, it should be appreciated that given variables such as book thickness, sensibility of the tag readers, detectability of the identification tags, relative geometry of the identification tag(s) and identification tag reader(s), or the like, one or more tag readers may be disbursed throughout a document as required.

Therefore, the tag reader/proximity sensor transceiver 540 can receive a plurality of differing types of signals depending on the exact configuration of the tag reader transceivers within a document. Accordingly, it may be necessary for the controller 530, in cooperation with the I/O interface 510, the memory 520, the identification tag page determination device 560 and the identification tag identifier memory 550 to determine which page(s) are currently being viewed by a reader. Specifically, having received signals corresponding to one or more identification tags that are received from the one or more tag reader transceivers 140 and 145, the identification tag page determination device 560 can determine, with reference to the identification tag identifier memory 550, which page is currently being viewed. The identification tag identifier memory 550 stores a list of relationships between identification tags and pages of the document. Thus, the identification tag page determination device 560, with reference to the identification tag identifier memory, can determine a relationship between the identifier tags and the actual page(s) of the document.

Additionally, the identification tag page determination device 560, upon querying the identification tag identifier memory 550 to determine a page relationship for the sensed identification tag also determines if dynamic content is associated with the sensed identification tag. If dynamic content is associated with the sensed identification tag, the identification tag page determination device 560, cooperating with controller 530, via link 505, forwards a control signal to the dynamic content controller 570. The dynamic content controller 570, forwards the appropriate control information to one or more dynamic content providing device(s) 700 via link 105. The dynamic content providing device(s) 700 can be one or more, or a combination of, music, sound effects, voice recordings, spot lighting, ambient room lighting, effects on a computer, such as dynamic text, colors, patterns, graphics, multimedia presentations, or the like, temperature, chair motion control, volume control, pan, fade, web page access, or the like. In this manner, the dynamic content can be directly correlated to the page(s) viewed by a reader.

The identification tag identifier memory 550 stores information pertaining to the document being read. In particular, prior to reading a document, the page identifications and corresponding dynamic content identifications are uploaded to the identification tag identifier memory 550 via, for example, the I/O interface 510 and the link 505. This information can be uploaded in tablized form or any other known or later developed format that is capable of interfacing with the identification tag page determination device 560 and the dynamic content controller 570.

Once the identification of a currently viewed page is determined, the page identification management system 500 begins monitoring the one or more proximity sensor(s) 25. As with the identification tags, once a proximity sensor 25 has been activated, by an object coming into its sensible range, a signal representing the identification of the proximity sensor is forwarded, via link 105 and the tag reader/proximity sensor transceiver 540 to the proximity sensor determination device 575.

A document, such as a book, may be provided with proximity sensor(s) 25 that are activated in different ways.

For example, a proximity sensor 25, upon detecting an object entering its sensible range can forward a signal corresponding to the proximity tag(s) 25 to the page identification management system 500. Alternatively, a proximity sensor 25, upon detecting an object leaving its sensible range, or remaining present within the sensible range for a predetermined period of time, can forward a signal corresponding to the proximity tag(s) 25 to the page identification management system 500. Alternatively still, the proximity sensor(s) 25 can monitor the distance the object is from the proximity sensor. Therefore, it should be appreciated that given variables such as book thickness, sensibility of the proximity sensors, relative geometry of the proximity sensor (s), or the like, one or more proximity sensors may be disbursed throughout a document and arranged on a page as required.

Therefore, the tag reader/proximity sensor transceiver 540 also receives a plurality of differing types of signals depending on the exact configuration of the proximity sensors within a document. Accordingly, it may be necessary for the controller 530, in cooperation with the I/O interface 510, the memory 520, the proximity sensor determination device 575 and the proximity sensor identifier memory 555 to determine which sensors are being affected by the presence of an object. Specifically, having received signals corresponding to the one or more proximity sensors 25, the proximity sensor determination device 575 can determiine, with reference to the proximity sensor identifier memory 555, which sensor has an object within its sensible range. The proximity sensor identifier memory 555 stores a list of relationships between proximity sensors 25 and the pages of the document. Thus, the proximity sensor determination device 575, with reference to the proximity sensor identifier memory 555, can determine a relationship between the activated proximity sensors and their location within the actual page (s) of the document.

Additionally, the proximity sensor determination device 575, upon querying the proximity sensor identifier memory 555 to determine a page relationship for the proximity sensor 25 also determines if dynamic content is associated with the activated proximity sensor. If dynamic content is associated with the proximity sensor, the proximity sensor determination device 575, cooperating with controller 530, via link 505, forwards a control signal to the dynamic content controller 570. The dynamic content controller 570, forwards the appropriate control information to one or more dynamic content providing device(s) 700, via link 105. As discussed above, the dynamic content providing device(s) 700 can be one or more, or a combination of, music, sound effects, voice recordings, spot lighting, ambient room lighting, effects on a computer, such as dynamic text, colors, patterns, graphics, multimedia presentations, or the like, temperature, chair motion control, volume control, pan, fade, web page access, CD-ROM access, or the like. In this manner, the dynamic content can be directly correlated to the proximity sensors activated by a user.

The proximity sensor identifier memory 555 stores information pertaining to the document being read. In particular, prior to reading a document, the proximity sensor identifications and corresponding dynamic content identifications are uploaded to the proximity sensor identifier memory 555 via, for example, the I/O interface 510 and the link 505. This information can be uploaded in tablized form or any other known or later developed format that is capable of interfacing with the proximity sensor determination device 575 and the dynamic content controller 570.

For example, Table 1 illustrates exemplary dynamic content that could be associated with the pages and/or proximity sensor(s) of a document.

TABLE 1

| Document | Page/Proximity Sensor Identification | Dynamic Content |
| --- | --- | --- |
| February 13 Sunday Paper | 1 | Play sound byte and control volume based on proximity |
| | 3 | Show multimedia restaurant advertisement on computer and zoom in on particular portion |
| | 89A | Retrieve theater schedule |
| | 127 | Obtain snow report |
| The Scary Book | 1–10 | Dim lights |
| | Chapter 15, all pages | Lower room temperature |
| | 147 | Play "breaking glass"; after 15 seconds play "Steps" if proximity still true |
| Law Review | 22 | Retrieve web page indicating case overturned |
| Textbook | 344 | Retrieve "pop quiz" web page and point to specific question based on pencil location in textbook |

For example, the page identification system according to this invention could be embedded in, for example, a television guide. Therefore, in a "view on demand" type television environment, as a reader peruses the pages of the television guide, previews of television shows, activated when the reader's finger comes into the sensible range of a thumbnail representing the show, could be displayed. Then, by placing, for example, a finger on the left side of the thumbnail, the preview could be rewound, and by placing a finger on the right side of the thumbnail the preview fast forwarded. Alternatively, if the page identification systems of this invention were embedded in a newspaper, the user could interact with, for example, a web page that could provide dynamic content based on the user pointing to a location within the currently viewed page. For example, upon purchasing a Sunday newspaper, a user could return home and download the identification tag information and proximity sensor information pertaining to the just purchased newspaper. This information can then be transferred, via any known or later developed technique, to the page identification management system 500 and stored in the identification tag identifier memory 550 and proximity sensor identifier memory 555, respectively. Then, as previously discussed, as the pages of the newspaper are viewed, the page identification management system 500 determines what, if any, dynamic content is associated with the pages, or locations within the pages of the just purchased newspaper, and controls that content.

Furthermore, it is to be appreciated that the dynamic content associated with one or more identification tags and proximity sensors need not be static. As previously discussed, new correlations between identification tags, proximity sensors and dynamic content can be downloaded and the identification tag identifier memory 550 and the proximity sensor identifier memory 555, respectively, updated with this information. Therefore, the systems and methods of this invention not only enable dynamic content to be associated with one or more pages and locations within a document, but allow for that dynamic content to change.

In another exemplary embodiment of the systems and methods according to this invention, imagine you are reading a "choose your destination" type book. As you read the book, dynamic content associated with the chosen course of action is determined by the page identification management system 500. Dynamic content corresponding to the currently read page can then further heighten the reading experience. For example, as a reader's hand approached the lower part of the left hand part of the book, a particular sound could be played with volume increasing with proximity.

Alternatively, the page identification systems and methods of this invention can be used to maintain a book's accuracy. For example, in the case of a scientific textbook, new discoveries are made every day. Alternatively, in the legal world, new precedents based on, for example, recently decided case law are rendering old precedents moot. Therefore, upon purchasing a book having the page identification system of this invention, the book can be kept current. Specifically, by updating the information stored in the identification tag identifier memory 550 and the proximity sensor identifier memory 555, new dynamic content can be retrieved, for example, from an associated web page, that indicates which portion(s) of the currently viewed page may be outdated. In particular, the dynamic content may be a call, via a web browser residing on a computer, to a specific uniform resource locator (URL).

Alternatively, dynamic content can be updated based on such factors as elapsed time, a personal identification, a page identification, the time of day, an external control, or the like. Furthermore, it is to be appreciated that the range of dynamic content can be based solely on proximity sensor information.

Figure 3:
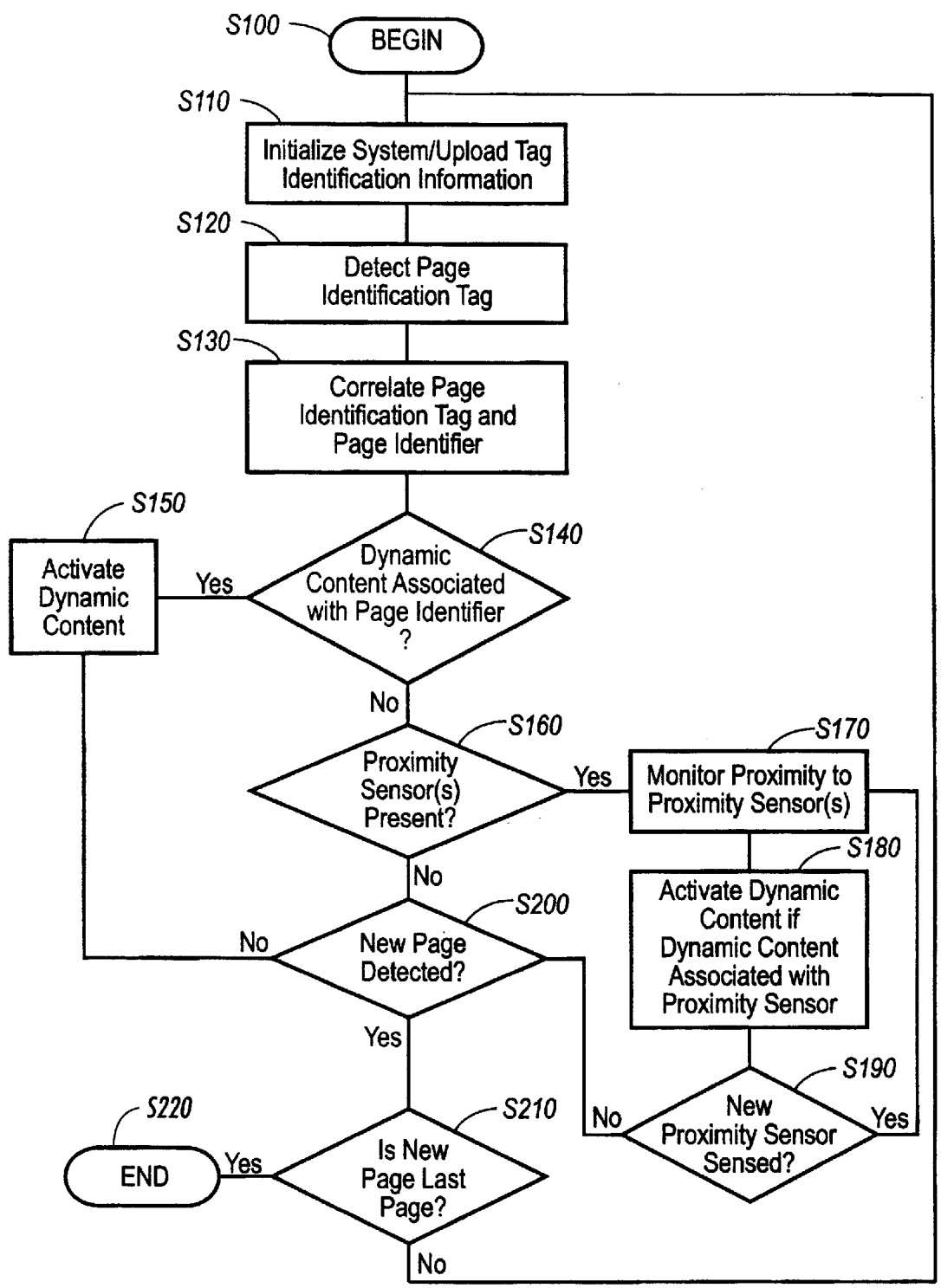
FIG. 3 is a flowchart outlining one exemplary embodiment of a method for detecting page identification and proximity information according to this invention.

FIG. 3 illustrates the operation of the page identification system according to this invention. Specifically, control begins in step S100. Next, in step S110, the system is initialized and the tag identification information is uploaded to the system. Then, in step S120, the currently viewed page is determined based on the detected page identification tag. Control then continues to step S130.

In step S130, a correlation is made between the page identification tag and the page identification. Next, in step S140, a determination is made whether dynamic content is associated with the page identification. If dynamic content is associated with the page identification, control continues to step S150. Otherwise, control jumps to step S160.

In step S150, the dynamic content associated with the page identifier is activated. Control then continues to step S160.

In step S160, a determination is made whether one or more proximity sensors are present on the viewed page. If one or more proximity sensors are present, control continues to step S170. Otherwise control jumps to step S200.

In step S170, the one or more proximity sensors are monitored to sense proximity of an object to the sensor. Next, in step S180, dynamic content is activated based on the proximity of an object to a proximity sensor. However, it should be appreciated that if a proximity threshold is not reached, no content pertaining to the proximity sensors are triggered. Then, in step S190, a determination is made whether a new proximity sensor has been activated. If a new proximity sensor has been activated, control jumps back to step S170. Otherwise control continues to step S200.

In step S200, a determination is made whether a new page has been detected. If a new page has not been detected, control continues back to step S160. Otherwise, control jumps to step S210.

In step S210, a determination is made whether the newly detected page is the last page. If the newly detected page is not the last page, control jumps back to step S110. Otherwise, control continues to step S220 where the control sequence ends.

As shown in FIGS. 1–2, the page identification and proximity sensing system is preferably implemented either on a single program general purpose computer or separate programmed general purpose computer, with associated tag reader transceiver devices and proximity sensors. However, the page identification and proximity sensing system can also be implemented on a special purpose computer, a programmed micro-processor or micro-controller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the flowchart shown in FIG. 3 can be used to implement the page identification and proximity sensing system according to this invention.

Furthermore, the disclosed method may be readily implemented in software using object or object-oriented software development environments that provide portable source code that can be used on a variety of computer or workstation hardware platforms. Alternatively, the disclosed page identification and proximity sensing system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The page identification systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed method may be readily implemented as software executed on a programmed general purpose computer, a special purpose computer, a microprocessor, or the like. In this case, the methods and systems of this invention can be implemented as a routine embedded on a personal computer such as a JAVA® or CGI script, as a resource residing on a server or graphics workstation, as a routine embedded in a dedicated page identification systems, a web browser, a web TV interface, a PDA interface, an interactive document or the like. The page identification and proximity sensing system can also be implemented by physically incorporating the systems and methods into a software and/or hardware system, such as the hardware and software systems of a personal computer or dedicated page identification system.

It is, therefore, apparent that there has been provided in accordance with the present invention, systems and methods for determining page identification, a portion within the page and any corresponding dynamic text. While this invention has been described in conjunction with the preferred embodiments thereof, it is evident that many alternatives, modifications and variations be apparent to those skilled in the art. Accordingly, applicants intend to embrace all such alternatives, modifications and variations that follow in the spirit and scope of this invention.

What is claimed is:

1. A page identification and proximity information system for use with an object, comprising:
   at least one identification tag;
   at least one identification tag reader having a sensible area that senses whether the at least one identification tag is located within the sensible area;
   at least one proximity sensor that senses whether the object is in a proximity of the at least one proximity sensor; and
   a page identification management system that determines a page identification, wherein the at least one identification tag and the at least one proximity sensor are associated with one or more portions of a document.

2. The system of claim 1, wherein the page identification management system controls dynamic content based on at least one of the determined page identification and proximity information corresponding to the at least one proximity sensor.

3. The system of claim 1, further comprising:
   an identification tag identifier memory that stores associations between the at least one identification tag and the one or more pages of a document;
   an identification tag page determination device that determines at least one currently viewed page based on the associations;
   a proximity identifier memory that stores associations between the at least one proximity sensor and the one or more portions of a document; and
   a proximity sensor determination device that determines at least one currently viewed portion of a page based on the associations.

4. The system of claim 3, wherein at least one of the proximity sensor identifier memory and the identification tag identifier memory identify dynamic content associated with the at least one currently viewed portion.

5. The system of claim 4, wherein the dynamic content is at least one of music, sound effects, voice recordings, spot lighting, ambient room lighting, temperature, chair motion control, volume control, pan, fade, web page access, and effects on a computer comprising dynamic text, colors, patterns, graphics and multimedia presentations.

6. The system of claim 4, further comprising a dynamic content controller that controls one or more dynamic content providing devices based on the at least one currently viewed page.

7. The system of claim 1, wherein at least one of the at least one identification tag and proximity sensor is at least one of an electronic device, a capacitive device, an inductive device, an electromechanical device, a micro-machine, a micro-electromechanical device, an ultrasonic transmitting device or a microchip.

8. The system of claim 1, wherein the at least one identification tag reader is at least one of a an electronic sensing device, an electromechanical sensing device, an inductive sensing device, a capacitive sensing device, a microchip reader, a micro-machine device reader, a micro-electromechanical device reader or an ultrasonic reader.

9. The system of claim 1, wherein the page identification management system is capable of determining at least one of the page identification and the proximity information based just on a users interaction with the document.

10. A method for determining at least one currently viewed page comprising:
    detecting at least one identification tag;
    sensing the proximity of an object to at least one proximity sensor; and
    correlating the at least one identification tag and a page identifier, wherein the at least one identification tag and the at least one proximity sensor are associated with one or more portions of a document.

11. The method of claim 10, further comprising activating dynamic content based on at least one of the page identifier and proximity information received from the at least one proximity sensor.

12. The method of claim 10, further comprising:
    retrieving an association between the at least one identification tag and the one or more pages of a document;
    determining at least one currently viewed page based on the association;
    retrieving an association between the at least one proximity sensor and the one or more sensible portions of a document; and
    determining at least one currently sensed portion based on the association.

13. The method of claim 12, further comprising identifying dynamic content associated with at least one of the currently viewed portion and the currently sensed portion.

14. The method of claim 13, wherein the dynamic content is at least one of music, sound effects, voice recordings, spot lighting, ambient room lighting, temperature, chair motion control, volume control, pan, fade, web page access, and effects on a computer comprising dynamic text, colors, patterns, graphics and multimedia presentations.

15. The method of claim 13, further comprising controlling one or more dynamic content providing devices based on the at least one currently viewed page.

16. The method of claim 10, wherein at least one of the at least one proximity sensor and the at least one identification tag is at least one of an electronic device, a capacitive device, an inductive device, an electromechanical device, a micro-machine, a micro-electromechanical device, an ultrasonic transmitting device or a microchip.

17. The method of claim 10, wherein the at least one identification tag reader is at least one of a an electronic sensing device, an electromechanical sensing device, an inductive sensing device, a capacitive sensing device, a microchip reader, a micro-machine device reader, a micro-electromechanical device reader or an ultrasonic reader.

18. The method of claim 10, wherein the page identification and proximity information are determined based just on a users interaction with the document.

19. An information storage medium having information that determines at least one currently viewed page comprising:
    information that effects detection of at least one identification tag;
    information that effects detection of at least one object to at least one proximity sensor; and
    information that correlates the at least one identification tag and a page identifier, wherein the at least one identification tag and the at least one proximity sensor are associated with one or more portions of a document.

20. The information storage medium of claim 19, further comprising information that activates dynamic content based on at least one of the page identifier and proximity information received from the at least one proximity sensor.

21. The information storage medium of claim 19, further comprising:
    information that retrieves an association between the at least one identification tag and the one or more pages of a document;
    information that determines at least one currently viewed page based on the association;

information that retrieves an association between the at least one proximity sensor and one or more sensed portions of a document; and information that determines at least one sensed portion based on the association.

22. The information storage medium of claim 21, further comprising information that identifies dynamic content associated with at least one of the at least one currently viewed portion and the at least one sensed portion.

23. The information storage medium of claim 22, wherein the dynamic content is at least one of music, sound effects, voice recordings, spot lighting, ambient room lighting, temperature, chair motion control, volume control, pan, fade, web page access, and effects on a computer comprising dynamic text, colors, patterns, graphics and multimedia presentations.

24. The information storage medium of claim 22, further comprising information that controls one or more dynamic content providing devices.

25. The information storage medium of claim 19, wherein at least one of the at least one proximity sensors and the at least one identification tag is at least one of an electronic device, a capacitive device, an inductive device, an electro-mechanical device, a micro-machine, a micro-electromechanical device, an ultrasonic transmitting device or a microchip.

26. The information storage medium of claim 19, wherein the at least one identification tag reader is at least one of a an electronic sensing device, an electromechanical sensing device, an inductive sensing device, a capacitive sensing device, a microchip reader, a micro-machine device reader, a micro-electromechanical device reader or an ultrasonic reader.

27. The information storage medium of claim 19, wherein the page identification and the sensed portion are determined based just on a users interaction with the document.

* * * * *